(No Model.)

T. CRANEY.
APPARATUS FOR MANUFACTURING CAUSTIC SODA.

No. 534,033. Patented Feb. 12, 1895.

Witnesses

Inventor
Thomas Craney
By Mr. L. Sprague & Son,
Atty's.

UNITED STATES PATENT OFFICE.

THOMAS CRANEY, OF DETROIT, MICHIGAN.

APPARATUS FOR MANUFACTURING CAUSTIC SODA.

SPECIFICATION forming part of Letters Patent No. 534,033, dated February 12, 1895.

Application filed May 7, 1894. Serial No. 510,282. (No model.)

*To all whom it may concern:*

Be it known that I, THOMAS CRANEY, a citizen of the United States, residing at Detroit, in the county of Wayne and State of Michigan, have invented certain new and useful Improvements in the Manufacture of Caustic Soda, of which the following is a specification, reference being had therein to the accompanying drawings.

My invention relates more specifically to that step in the manufacture of caustic soda in which the concentrated solution is subjected to high heat in so-called fusing kettles in order to repel the last traces of water, so that the product on cooling will solidify. Cast iron fusing kettles are found to be most available, but as cast iron contains always more or less impurities, especially the silicates of metallic oxides, the fusing always discolors the product more or less by the action of the caustic soda upon these impurities, and thereby renders it impure and reduces its market value. By a judicious selection of the cast iron, the discoloration of the product can be lessened. A more effective remedy which is in general use consists in injecting atmospheric air or oxygen into the caustic soda while being fused.

My invention consists in the application of the electric current for this purpose, all as hereinafter more fully described and shown.

Figure 1:
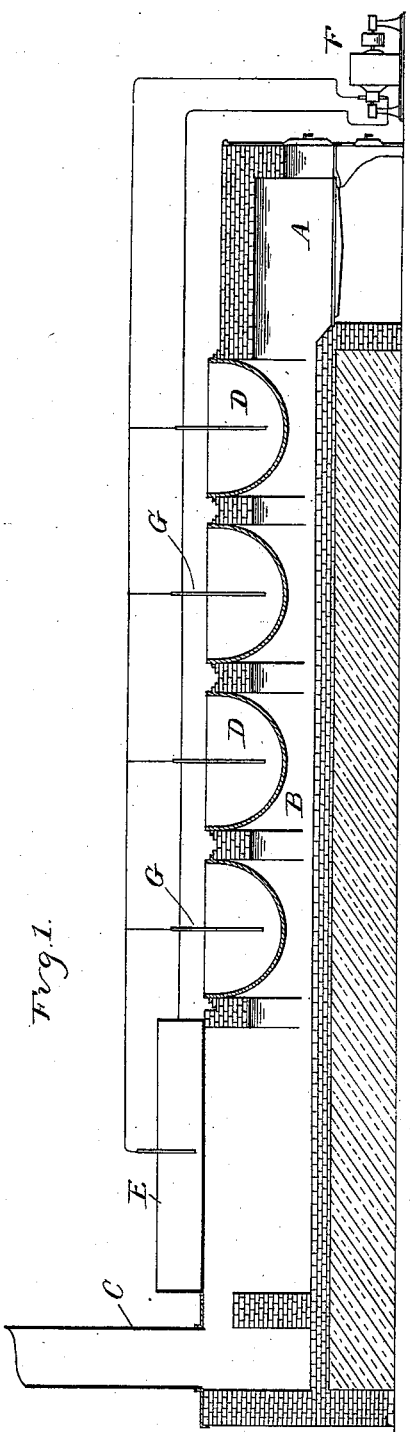
Figure 2:
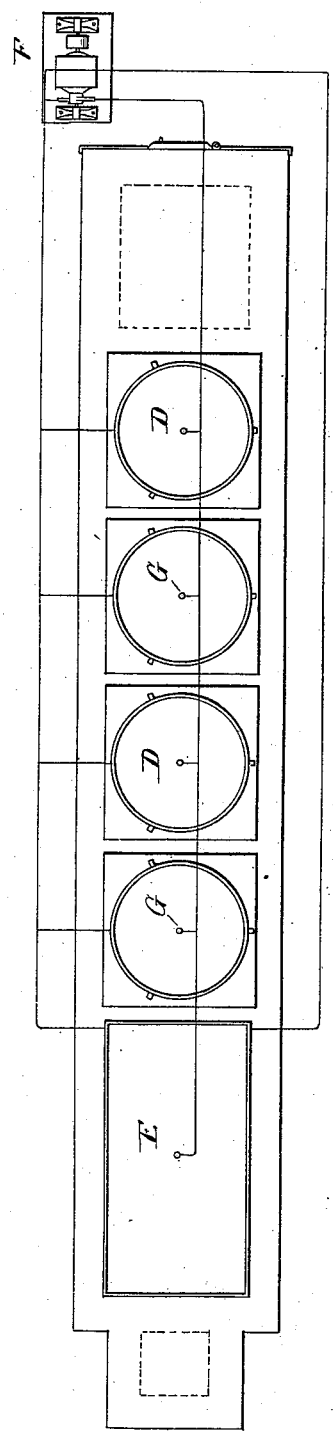

In the drawings, Figure 1 illustrates in vertical, longitudinal section an evaporating furnace of known construction to which my invention is applied. Fig. 2 is a plan view thereof.

A is the furnace provided with suitable appliances for burning fuel.

B is a horizontal flue through which the products of combustion are conducted.

C is the chimney.

D is a battery of fusing kettles and E is an evaporating pan, all of known construction and adapted to carry out the usual plan of operation which consists in supplying the concentrated solution of caustic soda, first into the evaporating pan E, from there into the first fusing kettle nearest to it, thence from the first into the second kettle and so on to the last, whereby with the constant increase in heat the last trace of water is finally expelled in the last kettle from which the product is then dipped out into the packages in which it solidifies.

In carrying out my invention in connection with this apparatus, I provide a suitable source of electricity F, and place into each fusing pan or kettle, one or more carbon electrodes G, and connect the negative pole of the source of electricity with the pans or kettles and the positive pole with the carbon electrodes.

In practice, the parts being constructed and arranged as shown and described, I obtain the object of my invention by subjecting the concentrated caustic soda to the electrolytic action of a current while being treated in the fusing kettle. The philosophy of this is that at this stage of the operation the electrolytic action results in the production of oxygen, which in its nascent state acts powerfully upon the metallic oxides and produces the higher oxides of the metals, which are insoluble, and can be separated by allowing the contents of the fusing kettles time to settle until the clear product can be readily dipped out.

My invention is especially advantageous in connection with the process of making caustic soda from salt brine. Here the caustic soda always contains more or less chloride of soda, but by subjecting the caustic soda solution again to electrolytic action in the fusing kettles when the liquid is concentrated, the remaining salt is all decomposed, besides, the chlorine which will be liberated by such decomposition being a powerful bleaching agent will at the same time act upon the organic matter (which may have been contained in the water), and thus remove another source of discoloration of the product.

The electrodes G are preferably formed of large pieces of gas carbon and for convenience sake are suspended in the kettles from the ends of the wire terminals, to which they are secured. The main wires may all be supported from overhead. In this way the free access to the apparatus is not interfered with in the slightest degree.

What I claim as my invention is—

In an apparatus for fusing caustic soda, the combination with a furnace, of a battery of fusing kettles and an evaporating pan, means for generating an electrical current, positive carbon electrodes located in the kettles and pan, out of contact therewith, and circuits from the generating means having contacts with the kettles and positive electrodes, substantially as described.

In testimony whereof I affix my signature in presence of two witnesses.

THOMAS CRANEY.

Witnesses:
M. B. O'DOGHERTY,
O. F. BARTHEL.